Patented Oct. 6, 1925.

1,555,852

UNITED STATES PATENT OFFICE.

OTTO HEIDEMANN AND MAX JOHN, OF BOCHUM, GERMANY.

DROP-DISPERSING AGENT.

No Drawing. Application filed August 18, 1921. Serial No. 493,493.

*To all whom it may concern:*

Be it known that we, OTTO HEIDEMANN, residing at 21, Kronenstrasse, Bochum, Germany, and MAX JOHN, residing at 19, Kronenstrasse, Bochum, Germany, have invented certain new and useful Improvements in Drop-Dispersing Agents, of which the following is a specification.

This invention relates in general to means for preventing the formation of drops on surfaces and more particularly to means for preventing rain from adhering to the panes of vehicles and the like in the form of drops. The formation of drops on surfaces is due to the mutual cohesion of the particles of the water being greater than their adhesion to the pane. Therefore the fundamental idea underlying the invention is to increase the adhesion of the water to the pane to such an extent that when it strikes against the pane its particles are torn apart and caused to spread and flow down in the form of a uniform layer that does not considerably affect the transparency of the wet pane.

This object is accomplished by means of a basic or fundamental substance (such as clay) capable of being converted into thin slime or mud and mixed with soda. This mixture is applied to the pane by rubbing it on and the first shower to which it is subjected will wash a part of the coating away, but will leave the pane in such a condition that drops of rain striking against it will immediately spread out into a fine film and flow off. This condition lasts several hours so that it will usually exceed the duration of the rain.

In order to increase the transparency of the pane, which is impaired at first by the mixture spread over it (especially with artificial light) a black color is added to the mixture. The thin blackish layer impairs the transparency much less than a light-colored layer, which has the effect of a curtain.

Clay has been found to be a suitable fundamental or basic substance, but any other material would be satisfactory that behaves like clay as far as the possibility of converting it into a slime or mud is concerned.

It has been found that a good mixture is one in which the proportion of soda to the aggregate quantity of the other parts is ten per cent. The said other parts consist of the basic substance and enough water to produce a material of a sufficiently soft consistency.

To maintain the doughy consistency of the drop-dispersing agent some glycerine may be added to it.

We claim:

1. The process of preventing the formation of rain drops on a glass surface consisting of applying to such surface a drop dispersing agent comprising a mixture of a liquid, a basic substance capable of being converted into a slime, and soda.

2. The process of preventing the formation of rain drops on a glass surface, consisting in applying to such surface a drop dispersing agent comprising a mixture of clay, water, and soda.

3. The process of preventing the formation of rain drops on a glass surface, consisting in applying to such surface a drop dispersing agent comprising a mixture of clay, water, and about 10% of soda.

In witness whereof we have hereunto set our hands.

OTTO HEIDEMANN.
MAX JOHN.